Jan. 18, 1944. W. VAN GUILDER 2,339,365
INDIRECTLY HEATED OVEN
Filed July 22, 1940 2 Sheets-Sheet 1

INVENTOR
Walter Van Guilder
By Parker, Carter, Pitzner & Hubbard
ATTORNEYS

Jan. 18, 1944. W. VAN GUILDER 2,339,365
INDIRECTLY HEATED OVEN
Filed July 22, 1940 2 Sheets-Sheet 2
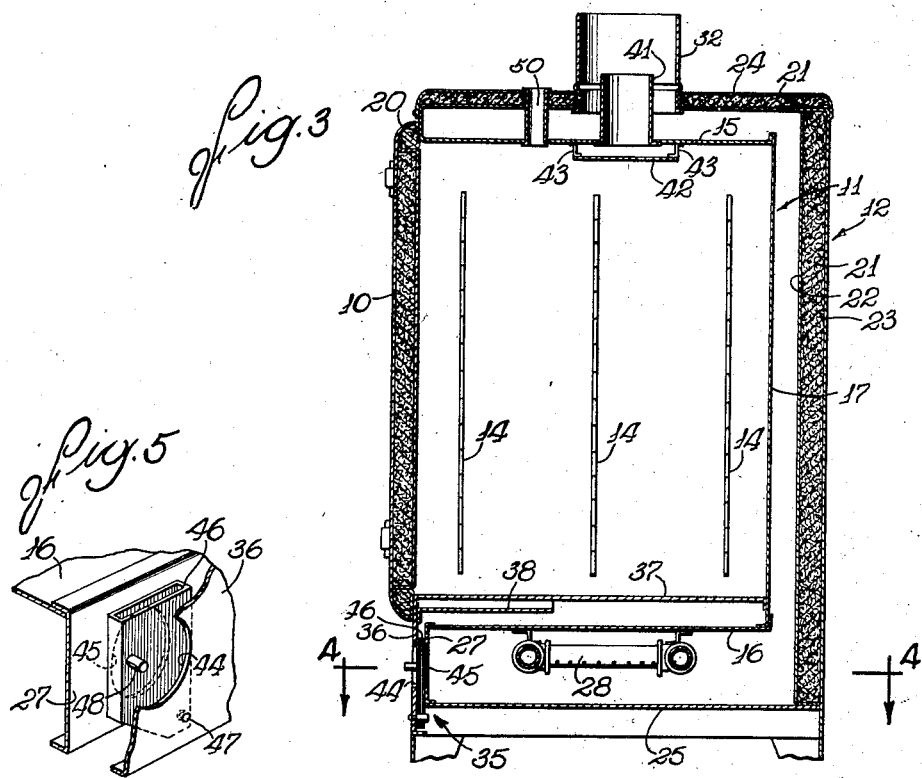
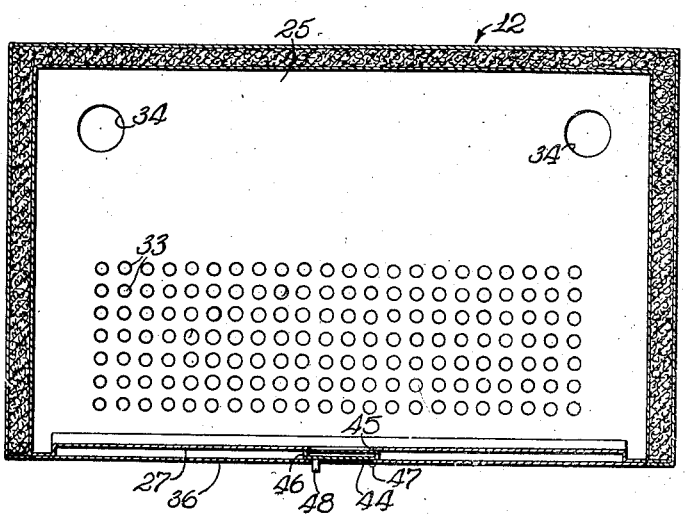
INVENTOR
Walter Van Guilder
ATTORNEYS Patented Jan. 18, 1944

2,339,365

UNITED STATES PATENT OFFICE 2,339,365

INDIRECTLY HEATED OVEN

Walter Van Guilder, River Forest, Ill., assignor to Precision Scientific Company, Chicago, Ill., a corporation of Illinois Application July 22, 1940, Serial No. 346,759

5 Claims. (Cl. 263—42)

The invention relates primarily to indirectly heated ovens such as are used, for example, for sterilization. By "indirectly heated" is meant an oven of the type in which the air within it has no actual contact with a gas burner or other combustion type heater for the oven but is instead warmed by radiation and conduction through an imperforate wall or the like so that there is no possibility of products of combustion from the heater entering the oven chamber.

One object of the invention is to provide an oven of the type indicated which has a materially higher efficiency and more even distribution of heat throughout the oven than could be obtained with ovens of this general type heretofore available.

Another object is to provide such an oven which is characterized particularly by the free and natural convection flow of both the indirectly heated air in the oven chamber itself and of the directly heated air and products of combustion from the burner.

Still another object is to provide such an oven in which a novel arrangement and construction of the parts accomplishes a rugged and efficient structure at quite low cost.

The invention also resides in various structural improvements by means of which the exterior finish on the apparatus is guarded against damage from the heater.

Further objects and advantages of the invention will become apparent as the following description proceeds, taken in connection with the accompanying drawings in which:

Fig. 3 is a vertical sectional view taken substantially along the line 3—3 in Fig. 2.

Fig. 4 is a transverse sectional view taken substantially along the line 4—4 in Fig. 3.

Fig. 5 is an enlarged detail perspective view of the hand holes and closure member therefor in the lower front portion of the oven.

Figure 1:
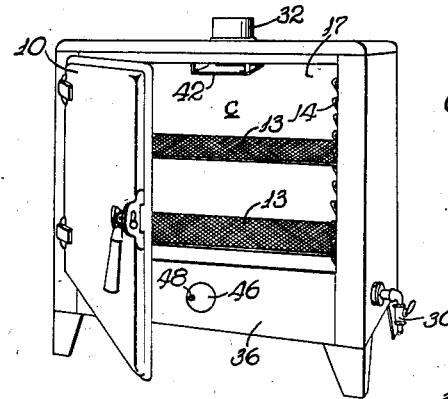
Figure 1 is a general perspective view of an oven embodying the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the particular structure herein shown for purposes of exemplification of the invention, the oven is of general cabinet form (Fig. 1) suitable for use in a laboratory or the like. The oven or warming chamber C within the cabinet is rectangular in shape and is closed by a front door 10. The cabinet structure comprises, in general, nested inner and outer shells, designated as generally 11 and 12, respectively (Fig. 2), and which are disposed in spaced relation for the circulation of a heating medium between them in a manner hereinafter described. The inner shell 11 defines the oven chamber C and articles to be treated are supported in it on suitable open work shelves 13 (Fig. 1) removably mounted on brackets 14 fixed to the inner faces of the shell.

Figure 2:
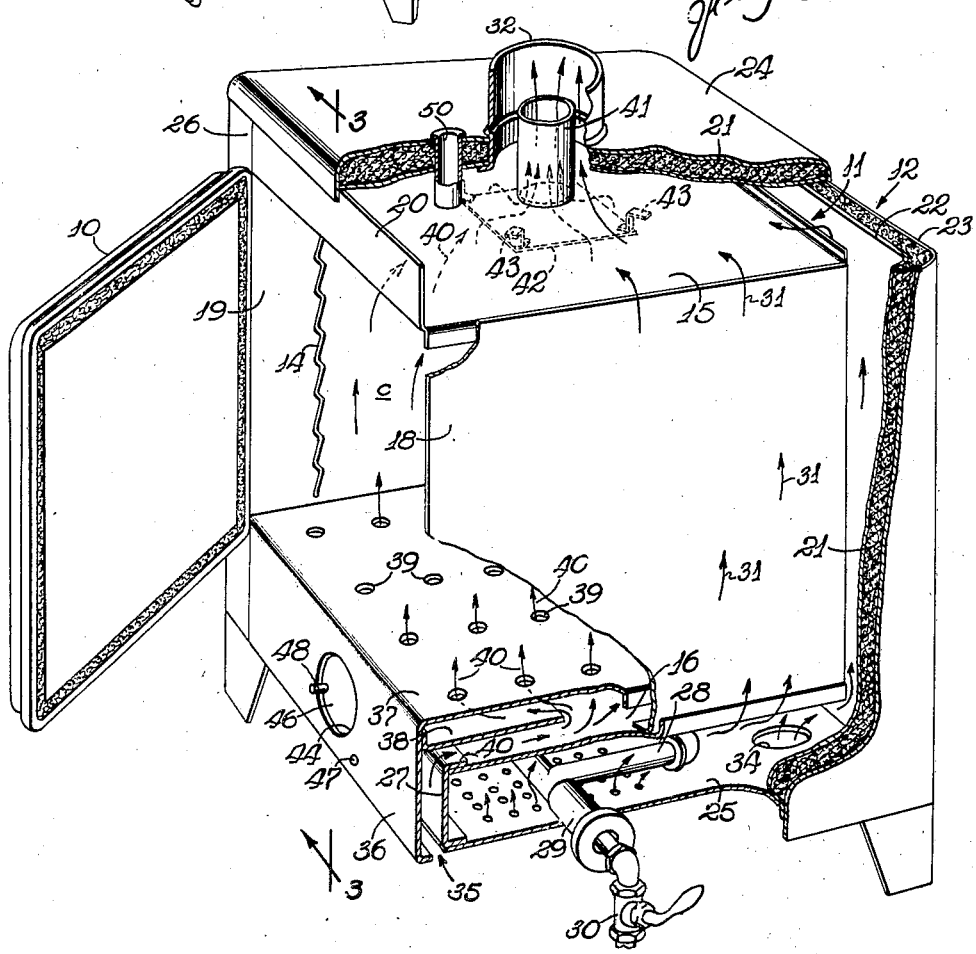
Fig. 2 is an enlarged perspective view of the oven with portions of the structure broken away to show the interior arrangement of the parts and the paths of air circulation.

The inner shell 11 is simply a rectangular sheet metal box comprising top, bottom, rear and end walls 15, 16, 17, 18 and 19, respectively. The front wall of the shell 11 is, of course, open and is arranged to be closed by the door 10 (Figs. 2 and 3). A flange 20 is bent up from the front edge of the top wall 15 and constitutes the exterior front portion of the cabinet above the door.

The outer shell 12 of the cabinet is of double walled construction and, in effect, comprises inner and outer sheet metal shells with thermal insulating material 21 between them (Fig. 2). Thus the end and rear walls of the cabinet are formed by nested sheet metal shells 22 and 23 with the insulating material between them. The forward edge portions of these shells are bent around to form the front wall portions of the cabinet at the side edges of the door 10 (see Fig. 1). The stop of the outer shell 12 is formed by a double walled removable cover structure 24 with the insulating material 21 between its walls. A sheet metal plate 25 (see Fig. 2) constitutes the bottom wall of the outer shell 12.

The inner and outer shells 11 and 12 are fixed together at their front portions. Thus, at the top of the structure the flange 20 on the inner shell 11 is joined at 26 to the adjacent front flange on the outer section 23 of the shell 12. Similarly in the lower portion of the cabinet the bottom walls 16 and 25, of the inner and outer shells 11 and 12, respectively, are fixed to the flanges of a channel 27.

Heating of the oven chamber C is accomplished, in the present instance, by means of a gas burner 28 (Figs. 2 and 3) interposed between the shell bottom walls 16 and 25, respectively. The burner shown is of conventional form and comprises a ported pipe bent in rectangular shape and supplied through a venturi 29 under the control of a manual valve 30. The heat from the burner 28 beats against the outer face of the bottom wall 16 of the inner shell. This wall 16 is, however, imperforate so that heat is transmitted indirectly from the burner to the air within the oven chamber C by conduction through this wall. The products of combustion from the burner 28, and the air warmed directly by it, flow upward by convection about the back and end walls 17, 18 and 19 of the inner shell, as indicated by the arrows 31 in Fig. 2. Thereafter these hot gases wash over the top wall 15 of the inner shell and are finally discharged through a vertical flue 32 set into the cabinet top 24. As these hot gases wash over the back and top walls of the inner shell, further heat is transferred to the interior of the latter so that, in all, the heat generated by the burner 28 is finally transferred with a high degree of efficiency to the inner oven chamber C.

Secondary air for the burner 28 is supplied through a series of holes 33 in the outer shell bottom wall 25 which underlies the burner (Figs. 2 and 4). In connection with the layout of holes in the bottom wall 25 it should also be noted that desirably two large apertures 34 are arranged in its rear corner portion to underlie the rear corners of the inner shell 11. Additional cool air is admitted throughout these holes 34 and, being mingled with the rising products of combustion, washes over the vertical edge portions of the inner shell at its rear corners. This is desirable in order to enhance the uniformity of temperature within the oven chamber C. In this connection it will be observed, upon a study of the construction that heat is supplied to the portion of the chamber C adjacent its rear corners from both the end walls and back wall. Consequently, unless some provision, such as holes 34, is provided for reducing somewhat the temperature of the air surrounding the rear edges of the inner shell (as compared to that washing over the central portions of the end and side walls) the area of the chamber C adjacent its rear corners will be overheated. By diluting the rising hot gases at the points noted, with cool air through the holes 34, this tendency to overheating at the rear corners is effectually overcome.

To define an entrance throat 35 (Fig. 2) for the admission of fresh air to the oven member C, the channel 27 is set back somewhat from the front of the cabinet and is overlaid in spaced relation by a front panel 36. Fresh air rises through this entrance passage 35 between the members 36 and 27, and flows into the chamber C where it is warmed by heat transmitted through the walls of the inner shell 11.

To diffuse the entering air uniformly throughout the oven chamber C and also to insure uniformity of heating of the same, prior to its entry into the chamber proper, a baffle arrangement is provided. For this purpose an apertured baffle plate 37 is used, the front panel 36 being, incidentally, an integral front flange on this plate. Furthermore, a second baffle plate 38 is arranged in spaced relation beneath the front portion of the baffle plate 37. Thus air entering through the passage 35 flows rearwardly over the upper surface of the bottom plate 16 where it is warmed by heat transmitted through this plate from the burner. As shown, the plate 37 is spaced a short distance above the bottom wall 16 of the oven chamber. Part of the entering air flows upward into the chamber C through holes 39 in the rear portion of the plate 37 while the rest of the air flows back over the edge of the inner baffle 37 and up through the holes 39 in the front portion of the plate 37, all as indicated by the arrows 40 (Fig. 2).

To insure a circulation of air through the oven chamber C, the velocity head of the products of combustion leaving the flue 32 is used to entrain air from the oven chamber and induce a flow through it. For this purpose an outlet conduit 41 is provided in the top of the inner shell 11 (Figs. 2 and 3), this outlet 41 being arranged to project up through the center of the flue 32 through a portion of the latter's height. Uniform distribution of the air circulation throughout the oven chamber C is further insured by mounting a rectangular baffle plate 42 beneath the mouth of the conduit 41, on brackets 43.

Particularly to be noted is the fact that the path of circulation for air through the oven chamber C is such that the entrainment effect of the products of combustion in the flue 32 augments the natural convection flow of air through the oven chamber. In other words, the air moves upward through the oven chamber in a direction which would be normal for convection flow alone and the entrainment of the air escaping from the oven chamber simply augments or increases this natural flow. In the same connection it should be noted that the flow of products of combustion and directly heated air between the inner and outer shells 11 and 12 is also always in the direction for normal convection flow, or, in other words, generally upwards to atmosphere, so that there is no tendency to impede or retard this natural flow and to trap the products of combustion in isolated hot pockets.

Access to the burner 28 for lighting, etc. is afforded through registering hand holes 44 and 45 formed in the low front portion of the cabinet in the front panel 36 and channel 27, respectively (Figs. 2 and 5). These hand holes are normally closed by a closure member 46 of box form pivoted at 47 to swing between the opposed faces of the members 36 and 27. A handle or pin 48 for swinging the closure member projects through the front hand hole 46. In connection with the construction of this portion of the apparatus it should also be noted that the location of the air intake passage 35 behind the front panel 36 effectually protects the enamel finish on the latter from overheating due to the proximity of the burner 28. The channel 27 itself, as well as the layer of cool entering air in the inlet 35 form an effective barrier against the transfer of an excessive amount of heat to the panel 36.

In using the oven described, the operator opens the valve 30 and reaches in through the hand holes 44, 45 to light the burner 28. Then the closure member 46 is restored to its closed position and the oven is heated until the chamber C reaches a stable temperature of, for example, some desired point between 200° to 450° F. such as is used in sterilization. A thermometer (not shown) inserted in a thermometer well 50 in the top of the oven (Fig. 2) serves to indicate the temperature within the oven.

The material to be sterilized is loaded on the shelves 13 and the door 10 is closed. The heating is continued for a desired period requisite for proper sterilization. During this heating the hot products of combustion from the burner 28 rise about the exterior of the inner shell 11, as described above, and escape through the flue 32. Fresh air entering the inlet 35 passes into the oven chamber, being heated from the hot bottom wall 16 of the inner shell 11, which directly overlies the burner 28, and is distributed by the baffle structure 37, 38. Further heat is, as previously described, transmitted to the air in the oven chamber through the rear, end and top walls of the inner shell 11. The warmed air within the oven chamber C rises to the outlet 41 where it is entrained by the escaping products of combustion so that a uniform circulation of air takes place within the oven chamber. This system of operation insures not only a very high degree of efficiency for ovens of this type but also has been found to insure great uniformity of temperature throughout the oven chamber.

I claim as my invention:

1. An oven comprising, in combination, two generally rectangular sheet metal shells nested together with top, bottom, end and back walls in spaced relation, the registering fronts of said shells being open, the front edges of said bottom walls being set back from the front edges of said top walls, a sheet metal panel extending between said front edges of the bottom wall and rigid with the same, an apertured diffuser plate overlying in spaced relation the bottom wall of said inner shell and having a downturned front flange spaced forwardly from said panel to define an air inlet passage into said inner shell beneath said diffuser plate, said flange being joined at its ends to said outer shell to form a front finishing panel for the lower portion of the structure, and a heater located between said shell bottom walls, the air in said inlet passage serving to form a heat insulating barrier between said heater and said finishing panel.

2. An oven comprising, in combination, two generally rectangular sheet metal shells nested together with top, end and back walls in spaced relation, the registering fronts of said shells being open, said inner shell having an upturned flange on the front edge of its top wall joined to the outer shell at its ends and forming a front finish panel for the upper portion of the front of the structure, said inner shell having an imperforate bottom wall with its front edge set back from the front edge of its top wall, an apertured diffuser plate overlying said bottom wall of the inner shell and spaced above it, said diffuser plate having a downturned flange along its front edge substantially flush with the first mentioned flange and joined at its ends to the outer shell to form a second finishing panel for the lower front portion of the structure, a vertical panel depending from the front edge of said inner shell bottom wall in spaced relation behind said second finishing panel to define an air inlet into said inner shell beneath said diffuser plate, and a heater beneath said bottom wall of the inner shell and behind said vertical panel.

3. An oven comprising, in combination, a cabinet structure having a liner therein defining an oven chamber with an inlet opening extending along an edge of the bottom of such chamber, said cabinet having a portion of its outer wall extending downward from the outer edge of said inlet opening, a panel extending downward from the inner edge of said inlet opening and coacting with said portion of the cabinet wall to define an air inlet channel open at its lower end and leading into said inlet opening, and a heater beneath said chamber and behind said panel, the blanket of fresh air in said channel forming a heat insulating barrier between said heater and said portion of the cabinet wall to protect the latter from overheating.

4. An oven comprising, in combination, a generally rectangular outer cabinet with an inner liner therein defining an oven chamber, said cabinet having a door opening in a side wall thereof for access to said chamber, said chamber having an air inlet opening in its bottom extending along just inside said door opening, a vertical panel beneath said liner spaced inward from the adjacent portion of the cabinet wall beneath said opening and coacting therewith to form an air inlet passage to said inlet opening, a heater beneath said liner, said panel and portion of the cabinet wall having registering hand holes therein to give access to the heater, and means forming a closure unit for closing both of said hand holes.

5. An oven comprising, in combination, an outer cabinet with an inner liner therein defining an oven chamber, a heating unit beneath said liner, said liner having an air inlet opening in its bottom adjacent one side edge of the latter, an apertured diffuser plate overlying the bottom of said liner in spaced relation to it, and a baffle interposed in spaced relation to both said diffuser plate and bottom of the liner, said baffle overlying said opening and only a portion of the bottom of the liner.

WALTER VAN GUILDER.